United States Patent
Schnurr (10) Patent No.: US 7,040,855 B2
(45) Date of Patent: May 9, 2006

(54) BLANK SUPPORT DEVICE

(75) Inventor: Carl Schnurr, Everett (CA)

(73) Assignee: Honda Motor Co., Ltd., (JP)

( * ) Notice: Subject to any disclaimer, the term of this patent is extended or adjusted under 35 U.S.C. 154(b) by 0 days.

(21) Appl. No.: 10/687,516

(22) Filed: Oct. 16, 2003

(65) Prior Publication Data

US 2004/0130084 A1     Jul. 8, 2004

Related U.S. Application Data (60) Provisional application No. 60/419,334, filed on Oct. 17, 2002.

(51) Int. Cl.
 *B65H 31/34*   (2006.01)

(52) U.S. Cl. .................... 414/789; 414/790.1

(58) Field of Classification Search ............... 414/789, 414/801, 789.1, 790, 790.1, 790.8; 294/119.1
See application file for complete search history.

(56) References Cited

U.S. PATENT DOCUMENTS

| | | | | |
|---|---|---|---|---|
| 1,330,639 A | * | 2/1920 | Leumann ................ 221/298 |
| 3,139,993 A | * | 7/1964 | Lauer .................... 414/796.2 |
| 3,866,763 A | * | 2/1975 | Alduk .................... 414/790.1 |
| 3,938,674 A | | 2/1976 | Kroeze et al. |
| 4,396,332 A | * | 8/1983 | Schmidt et al. ............. 414/789 |
| 4,639,181 A | * | 1/1987 | Tsubouchi ................ 414/349 |
| 4,684,308 A | * | 8/1987 | Dorner .................... 414/795.3 |
| 4,824,095 A | | 4/1989 | Fort |
| 4,927,321 A | * | 5/1990 | Lucas .................... 414/788.9 |
| 4,955,783 A | * | 9/1990 | Grazia ................... 414/795 |
| 5,000,438 A | | 3/1991 | Sardano et al. |
| 5,032,055 A | * | 7/1991 | Suzuki et al. ............. 414/795.3 |
| 5,039,084 A | * | 8/1991 | Messerly et al. ........... 271/213 |
| 5,091,754 A | | 2/1992 | Abe et al. |
| 5,265,856 A | | 11/1993 | Walker |
| 5,310,306 A | * | 5/1994 | Lunghi ................... 414/788 |
| 5,516,255 A | * | 5/1996 | Tygard .................... 414/607 |
| 5,674,048 A | | 10/1997 | Rich |
| 5,695,313 A | * | 12/1997 | Gross et al. ............. 414/793.4 |
| 5,746,571 A | | 5/1998 | Dietschi et al. |
| 5,883,522 A | * | 3/1999 | O'Boyle .................. 324/765 |
| 5,951,238 A | * | 9/1999 | Duecker .................. 414/794.9 |
| 6,045,571 A | * | 4/2000 | Hill et al. ................ 606/228 |
| 6,074,163 A | * | 6/2000 | Yamazaki et al. ......... 414/795.5 |
| 6,085,571 A | * | 7/2000 | Brinas et al. .............. 72/420 |
| 6,279,900 B1 | * | 8/2001 | Yamagishi ................ 271/240 |
| 6,299,161 B1 | | 10/2001 | Kang |
| 6,581,928 B1 | * | 6/2003 | Stephan .................. 271/188 |
| 6,641,358 B1 | * | 11/2003 | Schmidt et al. ........... 414/801 |

\* cited by examiner

*Primary Examiner*—Douglas Hess
(74) *Attorney, Agent, or Firm*—Schwegman, Lundberg, Woessner & Kluth, P.A.

(57) ABSTRACT

A device for handling blanks, comprises a blank pallet-receiving portion to be positioned downstream of a blank forming machine. The blank pallet-receiving portion defines a plane substantially parallel with a blank-receiving surface on a pallet positioned on the blank-receiving portion. Support means is positioned adjacent the plane beyond at least one edge of the blank-receiving surface. The support means is operable to support a free edge region of a blank resting on the blank-receiving surface and which free edge region extends beyond the blank-receiving surface. The support means is operable to be retracted when a predetermined number of blanks are present on the blank-receiving surface.

36 Claims, 6 Drawing Sheets

PRIOR ART

BLANK SUPPORT DEVICE

REFERENCE TO RELATED APPLICATION

The entire subject matter of U.S. Provisional application Ser. No. 60/419,334 filed Oct. 17, 2002 and entitled BLANK SUPPORT DEVICE is incorporated by reference. The applicant claims priority benefit under Title 35, United States Code, Section 119(e) of U.S. Provisional application Ser. No. 60/419,334 filed Oct. 17, 2002 and entitled BLANK SUPPORT DEVICE.

BACKGROUND OF THE INVENTION

1. Field of the Invention

The present invention relates to blank processing devices and more particularly to methods of stacking blanks on a pallet or other support following processing.

2. Description of the Related Art

Blank processing machines are commonly used in manufacturing, such as automobile manufacturing for fabricating chassis parts. The blanks emerging from a blank processing machine are typically loaded on a pallet. Pallets are both ubiquitous and of standard size to fit on the forks of lift trucks and the like. It is also a common step to "tamp" the edges of the blanks resting on the pallet so that they are aligned with one another. This is done with several reciprocating "tampers".

Problems arise when stacking blanks which exceed the size of the pallet carrying them. In this case, the blanks tend to bow and sag over the edges of the pallet causing them to slip beneath the tampers used to keep the blanks in a neatly stacked arrangement.

It is an object of the present invention to provide a novel approach to the support of blanks on a pallet or other blank support.

SUMMARY OF THE INVENTION

In one of its aspects, the invention provides a device for handling blanks, comprising:
  a blank pallet-receiving portion;
  the blank pallet-receiving portion providing a blank-receiving surface;
  support means positioned adjacent the blank-receiving surface;
  said support means being operable to support a free edge region of a blank resting on the blank-receiving surface and which free edge region extends beyond the blank-receiving surface;
  said support means being operable to be retracted or disabled when a predetermined number of blanks are present on the blank-receiving surface.

In one embodiment, alignment means is provided for aligning adjacent free edge regions of a plurality of blanks on the blank-receiving surface. In one example, the alignment means includes one or more tamper units for tamping the blanks. The tamper units each include a frame member with an abutment surface for abutting the blanks. In this case, the support means includes a retractable support member which is mounted for movement with the tamper frame member. The retractable support member may, for example, be a ram movable under the drive force of a drive unit or be in some other form.

Preferably, the drive unit is an hydraulic cylinder, a pneumatic cylinder or a solenoid driven linear actuator, or some other form of drive mechanism.

In another of its aspects, the present invention provides, in one embodiment, a method of processing blanks, comprising the steps of:
  providing a blank-receiving surface adjacent or downstream from a discharge end of a blank processing machine;
  locating a plurality of blanks on the blank-receiving surface, wherein each of the blanks further includes at least one free edge region which extends beyond a peripheral region on the blank-receiving surface;
  aligning adjacent free edge regions of the plurality of blanks;
  providing support beneath the adjacent free edge region of the blanks; and
  withdrawing the support when the accumulated plurality of blanks exceeds a predetermined number.

In one embodiment, the step of aligning includes abutting the free edge region with an abutment member, such as for example in a process referred to as tamping.

Preferably, during the step of providing support, the free edge region is prevented from sagging below a point of contact with the abutment member. In one example, the abutment member is aligned with the blank receiving surface and wherein, during the step of providing support, the free edge is prevented from sagging below the blank receiving surface. Alternatively, the free edge may be prevented from sagging below or another suitable reference point.

In one embodiment, the method further comprises the step of providing a retractable support member for movement with the abutment member. In one example, the retractable support member on the abutment member, and a ram is provided to displace the retractable support member, under a drive force delivered by an hydraulic cylinder, a pneumatic cylinder or a solenoid driven linear actuator, or the like.

In one embodiment, the aligning step is performed at a plurality of locations, each adjacent a corresponding first free edge region.

In one embodiment, an anchoring surface is provided at a second free edge region opposite a corresponding first free edge region, enabling the aligning step to occur by moving the abutment at the first free edge region against the anchoring surface at the second free edge region.

In one embodiment, the blank receiving surface is provided by a pallet, but may be provided by other platens, platforms or frame arrangements, or combinations thereof, and which may be stationary or movable, and separate from or integrally formed with a mobile transfer unit such as lift truck, a robotic transfer station or the like.

In still another of its aspects, the present invention provides a processing line for processing blanks, comprising:
  a blank processing station,
  a blank receiving unit to be positioned downstream of the blank processing station, the blank receiving unit having a blank receiving surface on which blanks are to be delivered;
  support means positioned adjacent the blank-receiving surface;
  said support means being operable to support a free edge region of a blank resting on the blank-receiving surface and which free edge region extends beyond the blank-receiving surface;
  said support means being operable to be retracted when a predetermined number of blanks are present on the blank-receiving surface.

In one embodiment, the stamping line is useful in the stamping of parts for an automobile assembly line and comprises alignment means for aligning at least one adjacent free edge region of a plurality of blanks on the blank receiving surface. The alignment means includes at least one frame member with an abutment surface for abutting the blanks and displacement means for displacing the frame member between a blank engaged position and a blank disengaged position. The support means has a retractable support member which is mounted for movement with the frame member. In one example, the retractable support member includes a ram movable under the drive force of a drive unit.

In one embodiment, the stamping line further comprises conveying means for conveying the blanks between the blank forming station and the blank receiving surface. Preferably, the conveying means includes a magnetic conveyor, but may also include other forms of conveyors such as those which propel the blanks using pneumatic, hydraulic or mechanical arrangements, including those which implement forces other than magnetic forces for entraining the blank on the conveyor, such as vacuum, air pressure and the like.

In still another of its aspects, the present invention provides a device for handling blanks, comprising:
 a blank pallet-receiving portion to be positioned downstream of a blank forming machine;
 the blank pallet-receiving portion defining a plane substantially parallel with a blank-receiving surface on a pallet to be positioned on the blank-receiving portion;
 a temporary blank support assembly positioned adjacent the plane beyond at least one edge of the blank-receiving surface;
 said temporary blank support assembly being operable to support a free edge region of a blank resting on the blank-receiving surface and which free edge region extends beyond the blank-receiving surface;
 said blank support assembly being operable to be retracted when a predetermined number of blanks are present on the blank-receiving surface.

In still another of its aspects, the present invention provides a method of processing blanks, comprising:
 a step for providing a blank-receiving surface adjacent or downstream from a discharge end of a blank processing machine;
 a step for locating a plurality of blanks on the blank-receiving surface, wherein the blanks further include at least one free edge region which extends beyond a peripheral region on the blank-receiving surface;
 a step for tamping at least one free edge region of the blanks to align adjacent free edge regions thereof; and
 a step for providing temporary support beneath the free edge region of the blanks to prevent the blanks in the free edge from sagging below the plane of the blank-receiving surface; and
 a step for withdrawing the temporary support when the accumulated plurality of blanks exceeds a predetermined number.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
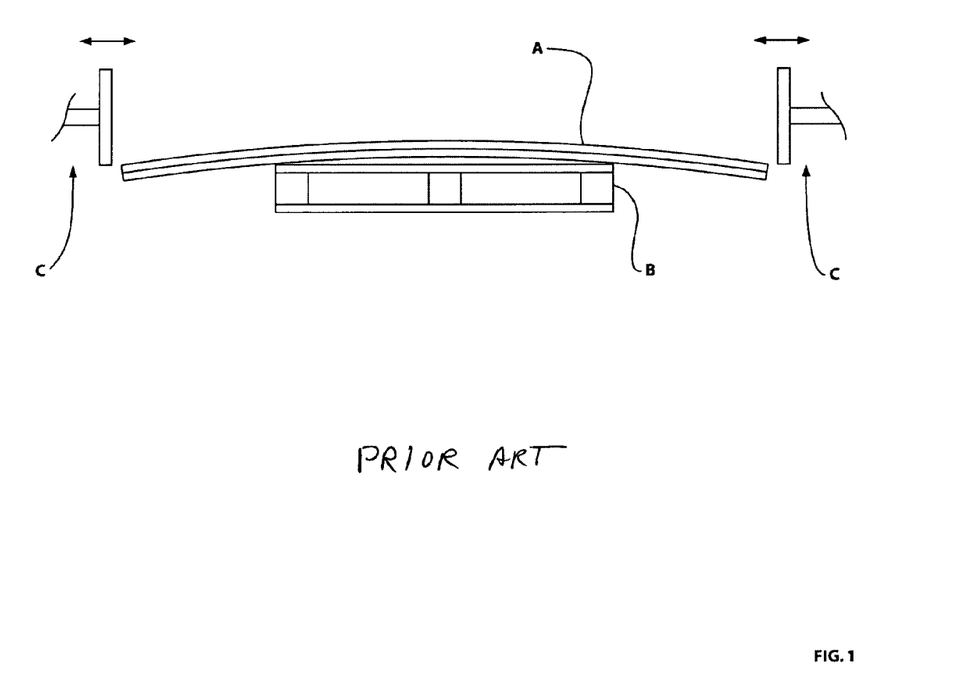
FIG. 1 is a schematic view of prior art method of supporting a blank.

The figures illustrate two comparative examples of supporting blanks. FIG. 1 illustrates a PRIOR ART example. Here, a number of blanks A are shown on a pallet B and are sagging on either side thereof. Tampers C are provided to align the blanks. However, the tampers are unable to catch the free ends of the blanks and because they are sagging. Consequently, the first few blanks must be aligned manually or not at all.

Figure 2:
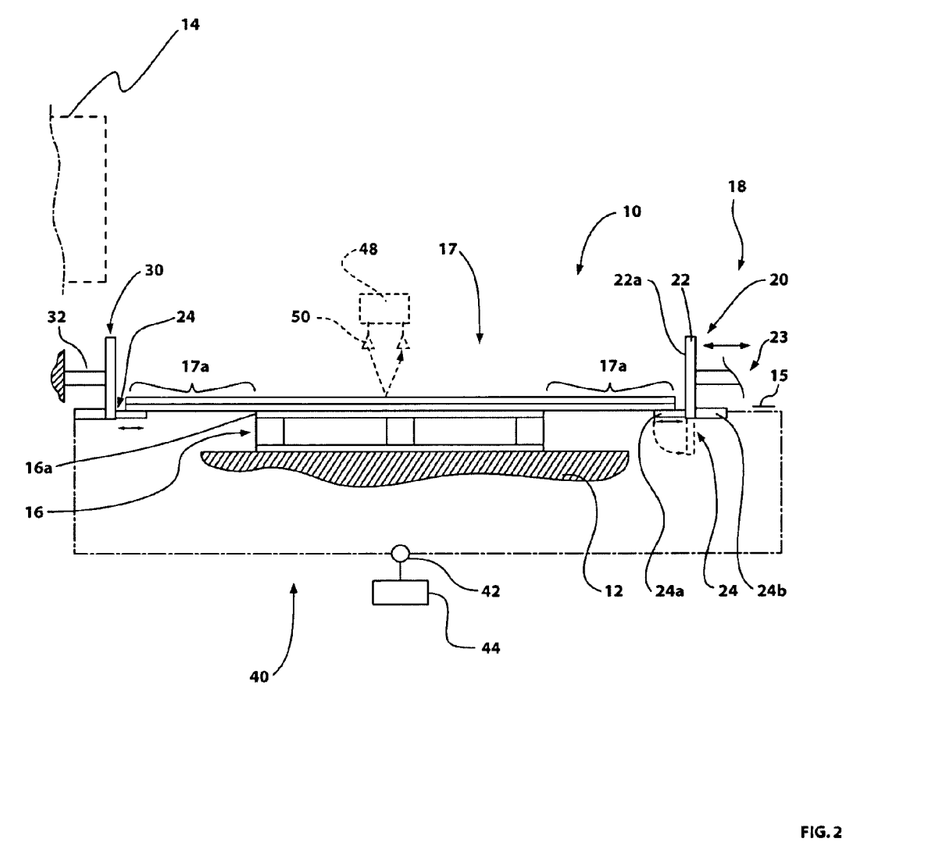
FIG. 2 is a schematic view of a device for supporting a blank according to one embodiment of the present invention, and taken on line 2—2 in FIG. 5.

One embodiment of the invention is illustrated in FIG. 2 in the form of a device 10 for handling blanks. The device 10 has a pallet-receiving portion 12 to be positioned downstream of a blank forming machine shown schematically at 14. The pallet-receiving portion defines a plane 15 which is substantially parallel with a blank-receiving surface 16a on a pallet 16 positioned on the blank-receiving portion 12.

The device 10 is used, in this particular example, to assemble blanks formed from a blank forming machine in an automobile manufacturing operation for the later stamping of automobile chassis parts, such as door frames and skins, trunk lid frames and skins, engine hood frames and skins, roof panels and the like. However, it will be understood that the device 10 may be used in other manufacturing industries as well, particularly where the stacking of blanks which are mismatched to their underlying blank receiving surface, be it on a pallet or otherwise, results in them overhanging the surface.

As will be described, support means (shown generally at 18) are positioned adjacent the plane 15 and beyond the corresponding free edge of the blanks, shown collectively at 17, which land on the pallet 16 from the blank forming machine 14. As will be described, the support means 18 are operable to support a free edge region of a blank shown at 17a which extends beyond, the blank-receiving surface 16a. The support means 18 is operable to be retracted or otherwise disabled when a predetermined number of blanks, such as ten blanks (or more or less depending on the circumstances) are present on the blank-receiving surface 16a.

A number of alignment means, in the form of the tamper units 20 are provided for aligning adjacent free edge regions of a plurality of stacked or nested blanks on the pallet 16. The tamper units 20 each include a tamper frame member 22 with a tamper abutment surface 22a for abutting the blanks.

The tamper frame member 22 is coupled to a reciprocating mechanism shown schematically at 23 which, in this case, may be an hydraulic, pneumatic or solenoid actuated ram, linkage or some other suitable mechanism which is not shown for the sake of brevity. The support means 18 has a retractable blank support member 24 which, in this case, is mounted on the tamper frame member 22 for movement therewith. In this case, the retractable support member provided in the form of a ram 24a which is movable under the drive force of an air cylinder 24b, or alternatively an hydraulic ran, solenoid driven or other actuator. Alternatively, the support member may not be retracted along an axis in the manner of a ram moving relative to a cylinder, but rather disabled in some other manner. For example, the support member may be hinged to the tamper frame member, and radially movable, for instance, between an operable position, as shown in solid lines in FIG. 2 and an inoperable position as shown in dashed lines in FIG. 2, about a path represented by a dashed circular arc, also shown in FIG. 2.

Figure 3:
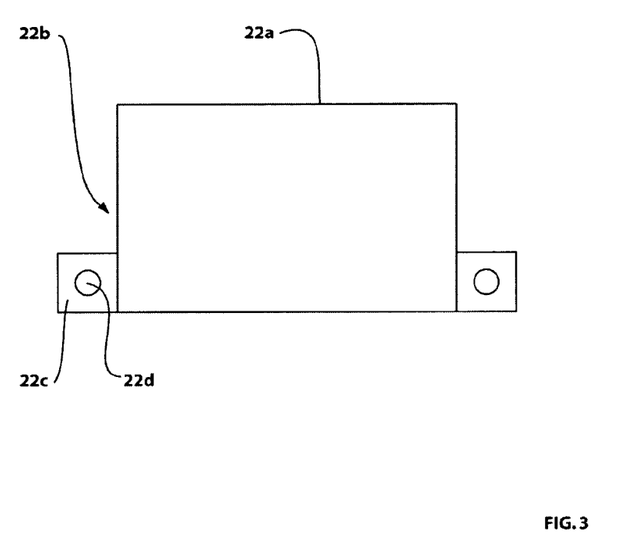
FIG. 3 is a front view of one portion of the device shown in FIG. 2.
Figure 4:
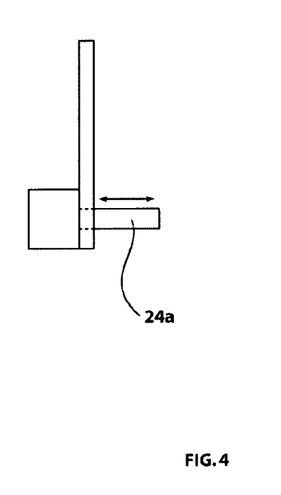
FIG. 4 is a side view of the portion shown in FIG. 3.

Referring to FIG. 3, the abutment surface 22a has a lower section 22b carrying a pair of plates 22c. Each plate 22c serves as a mounting location for a corresponding cylinder and a passage 22d is provided in each plate for receiving the ram 24a there through, as can be seen in FIG. 4.

In this case, the reciprocating tamper unit 20 is located on the right hand side of the device as viewed in FIG. 2. A stationary tamper unit 30 is provided on the left hand side of the device as viewed in FIG. 2, but is similarly provided with the reciprocating support member 24. The stationary tamper unit 30 is supported by a frame assembly shown schematically at 32. This arrangement is beneficial because the right hand side tamper unit 22 reciprocates and is set to press the blanks into abutment with the stationary tamper unit 30.

The air cylinders driving the support members on each tamper unit are coupled to a controlled air supply 40. The air supply is actuated by an air valve 42 which is in turn controlled by a controller 44. The controller may be a PLC or a general purpose computer which is configured to extend the rams 24a at the onset of a blank stacking process and to withdraw the rams 24a at the appropriate time when a predetermined number of blanks have been stacked on the pallet.

This predetermined number may be established by a counting means for counting the number of blanking operations by the blanking device, for example by way of a signal received from the blanking device or a controller therefor.

Figure 2A:
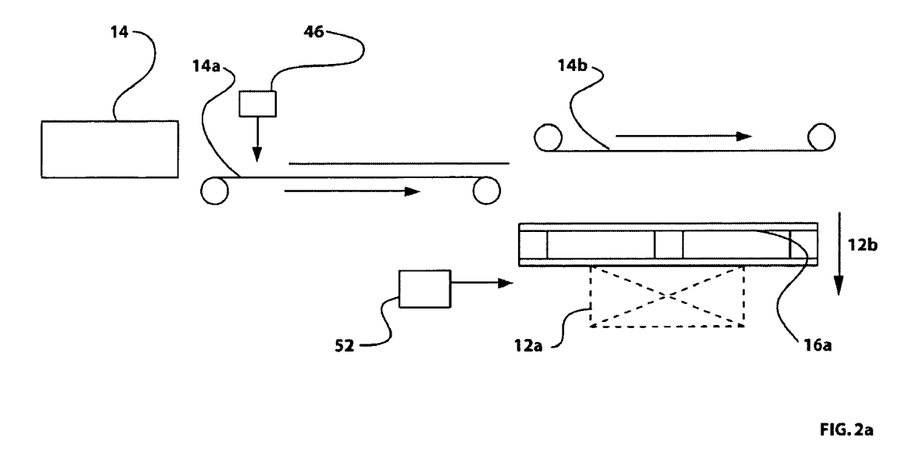
FIG. 2a is a schematic view of an alternative device for supporting a blank.

FIG. 2a shows a portion of an alternative to the device 10 shown in FIG. 2. Referring to FIG. 2a, the signal may be obtained or derived from a signal to initiate the stamping step, or from an optical unit, such as a photo eye as shown at 46, which is trained to detect the presence of a blank at a predetermined location on a path of the blanks between the stamping unit and the blank receiving surface. In this case, the path may be provided by a conveying means, such as a first magnetic conveyor 14a positioned between stamping line 14 and the blank receiving surface 16a, and a second magnetic conveyor 14b positioned above the blank receiving surface 16a. In this case, the first magnetic conveyor 14a is operable to transfer the blank to the second magnetic conveyor which itself is operable to slow down or dwell temporarily at a location where the blank is directly above the blank receiving surface 16a and then release the blank onto the blank receiving surface. Thus, the device shown in FIG. 2a provides a conveyor means for conveying blanks between the stamping unit and the blank receiving surface.

Alternatively, the predetermined number may be determined by measuring the weight of the blank present on the pallet 16. Alternatively, as shown in FIG. 2, the predetermined number may be detected by an optical detection means 48, for example by way of an optical beam 50 positioned adjacent or above the pallet 16 which is obstructed, distorted or deflected by a detectable degree when the predetermined number of blanks is present on the blank. This may be useful in instances where the blank receiving surface 16a remains substantially stationary during the stacking process. There are other cases where the blank receiving surface may be indexed, for example by way of an indexing mechanism shown schematically at 12a, in FIG. 2a, operating to index downwardly as shown by arrow 12b, in which case an optical or mechanical sensor 52 may detect when the indexing mechanism reaches a predetermined position signifying the predetermined number of blanks present on the blank.

The function of the controller 44 system may be provided in a number of forms. It may be embodied in a software program configured to run on a general purpose computer, such as personal computer, or on a more substantial computer mainframe. The general purpose computer may work within a network involving several general purpose computers, for example those sold under the trade names APPLE™ or IBM™, or clones thereof, which are programmed with operating systems known by the trade names WINDOWS™, LINUX or other well known or lesser known equivalents of these. The system may involve pre-programmed software using a number of possible languages or a custom designed version of a programming software sold under the trade name ACCESS™ or similar programming software. The computer network may be a wired local area network, or a wide area network such as the Internet, or a combination of the two, without or without added security, authentication protocols, or under "peer-to-peer" or "client-server" or other networking architectures. The network may also be a wireless network or a combination of wired and wireless networks. The wireless network may operate under frequencies such as those dubbed 'radio frequency' or "RF" using protocols such as the 802.11, TCP/IP, BLUE TOOTH and the like, or other well known Internet, wireless, satellite or cell packet protocols. The system may, alternatively, be executed on a single custom built computer which is dedicated to the function of the system alone.

Figure 5:
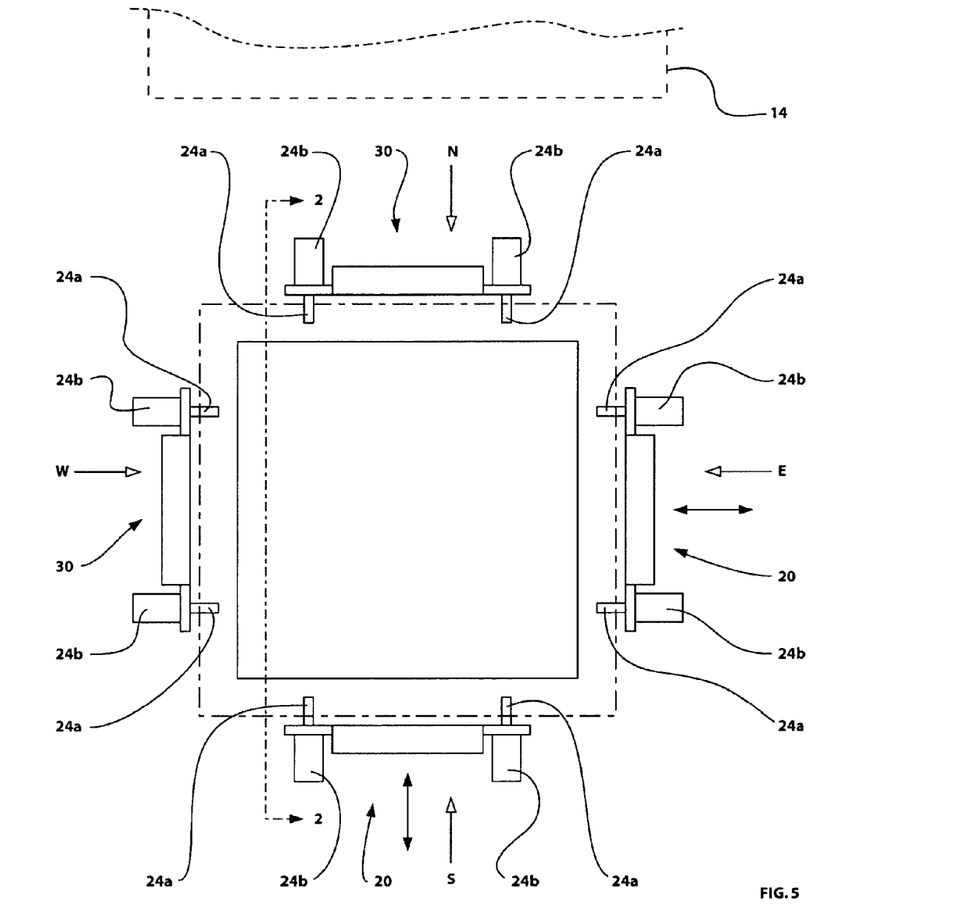
FIG. 5 is a plan view of the device of FIG. 2.
Figure 6:
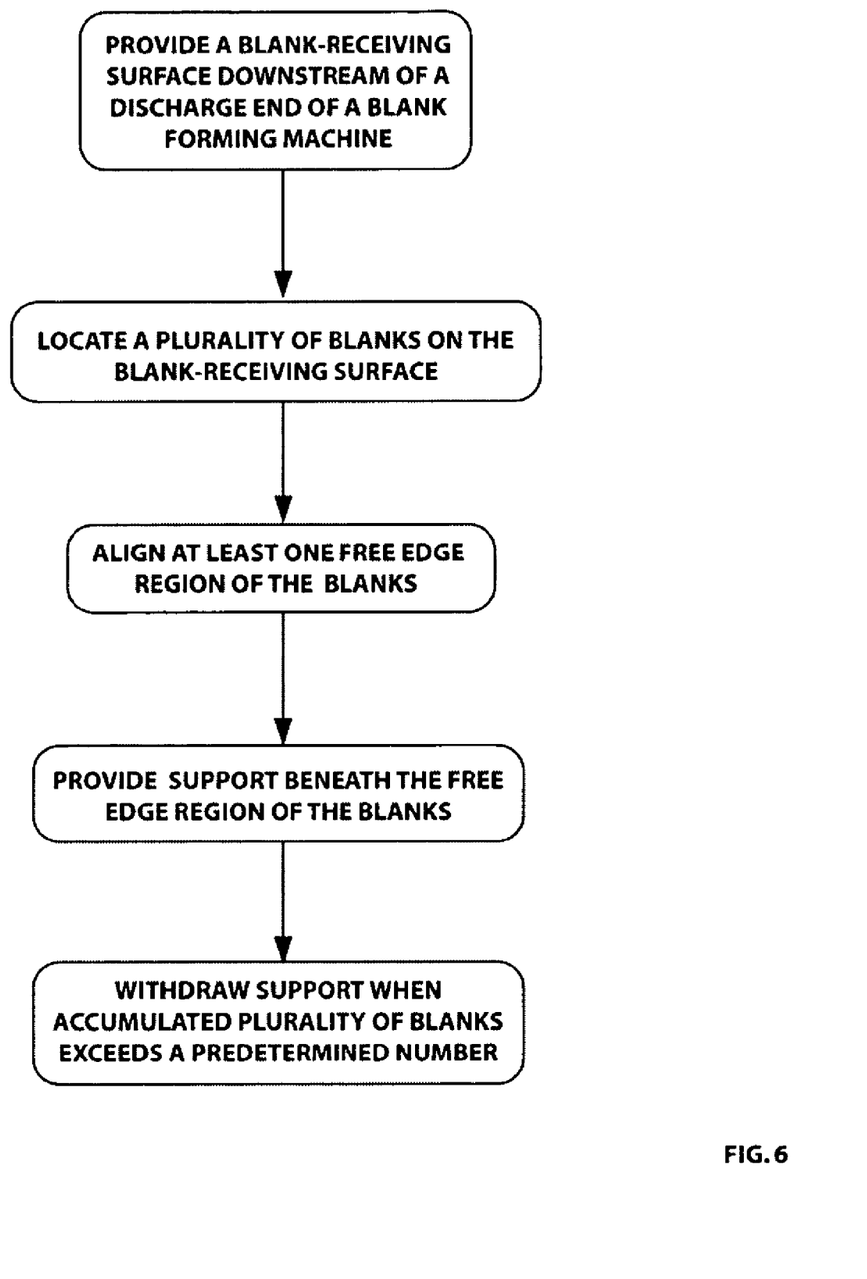
FIG. 6 is a flow diagram of a method processing blanks.

A plan view of the device 10 is shown in FIG. 5. For clarity, the blank edges are identified by the compass labels "north", "south", "east" and "west". In this particular example, not all tampers need to reciprocate. For instance, the south and east tampers may be arranged to reciprocate against stationary north and west abutment members.

Thus, referring again to FIG. 2, a number of the tamper units 20 are provided on opposite sides of the blanks and the air cylinders 24b are mounted on the lower edge of the tamper frame member and the rams 24a are extended out temporarily to support the overhanging free edge region 17a of the first few blanks shown at collectively at 17. As the weight of the overall stack increases, the stack is less likely to sag, in which case the support provided by the rams 24a is no longer necessary and may be retracted at a designated time.

The air cylinders 24b are attached to the lower end of the tamper frame members and reciprocate with them. The rams 24a are deployed outwardly for the initial pallet stacking sequence to support the first few blanks 17. The air cylinders are then retracted, after that initial sequence, when the collective weight of the blanks on the pallet lessens the sag to a satisfactory degree. Therefore, there are two reciprocating sequences, the first being the tampers and second being the cylinders on the tampers.

Thus, the device 10 is believed to provide a method of supporting blanks during a blank stacking procedure, so that the edges of the blanks can be aligned in an effective manner. First, an empty pallet is provided adjacent or downstream from the discharge end of a blank forming machine, thereby to form a blank-receiving surface. Next, a plurality of blanks 17 are located on the blank-receiving surface, for example by aligning the blank receiving surface at a designated end location on a magnetic conveyor. In this case, the blanks arrive on the blank receiving surface with a velocity, the magnitude of which will depend on the travel speed of the magnetic conveyor. The blank thus has, in this particular case, a significant lateral momentum at the instant that the moving blank lands on the blank receiving surface, be it on the pallet or the upper surface on the uppermost blank in the stack of blanks on the pallet. In the latter case, there may be a momentary cushion of air between the approaching blank and the uppermost stationary blank, causing relatively little friction to slow down approaching blank. In this case, the retractable members 24a and the tamper frame members 22 and 30 function as a blank catcher to prevent the leading edge of the blank from otherwise sagging downwardly and, as a result, slipping beneath the tamper frames. With the retractable members in place, the blank is caught by the tamper units. Of course, the method may also be applied to an apparatus where there is no significant lateral momentum, that is where the blanks are brought to a position immediately above the blank receiving surface and delivered thereto.

In the case of device 10, the blanks further include at least one, in this case four, free edge regions 17a which extend beyond a peripheral region on the blank-receiving surface. At least one of the free edge regions of the accumulating blanks is tamped or otherwise manipulated to align adjacent free edge regions thereof. In this case, the device 10 provides temporary support beneath the free edge region 17a of the blanks 15 during this step to prevent the blanks in the free edge region from sagging below the plane of the blank-receiving surface, or some other reference point, such as a point of contact with the tamper frame member, for example the lower most point on the tamper frame member. This may depend on the flexibility of the blanks, the location of the tamper units or similar alignment means relative to the blank receiving surface, the size of the tamper frame member and the like. Finally, the temporary support is withdrawn when the accumulated plurality of blanks exceeds a predetermined number or when the accumulated plurality of blanks exceeds a predetermined weight or by some other measure.

The device is also applicable to blanks which may have one free edge region extending over the pallet, such as can occur when the blanks are of oblong shape, for instance. In this case, the temporary support may be provided at that one free edge free edge region.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A device for handling blanks, comprising:
   a blank receiving portion;
   the blank receiving portion providing a blank-receiving surface;
   support means positioned adjacent the blank-receiving surface;
   said support means being operable to support a free edge region of a blank resting on the blank-receiving surface and which free edge region extends beyond the blank-receiving surface;
   said support means being operable to be retracted or disabled when a predetermined number of blanks are present on the blank-receiving surface, the blank receiving portion being operable after the support means has been retracted or disabled to receive additional blanks beyond the predetermined number of blanks.

2. A device as defined in claim 1, further comprising alignment means for aligning adjacent free edge regions of a plurality of blanks on the blank-receiving surface.

3. A device as defined in claim 1, wherein the blank receiving surface is provided by a pallet or one or more other platens, platforms or frame arrangements, stationary or movable, or combinations thereof, including those which are separate from or integrally formed with a mobile transfer unit.

4. A device for handling blanks, comprising:
   a blank-receiving portion;
   the blank-receiving portion providing a blank-receiving surface;
   alignment means for aligning adjacent free edge regions of a plurality of blanks on the blank-receiving surface the alignment means including at least one tamper unit for tamping the blanks, support means positioned adjacent the blank-receiving surface and associated with the at least one tamper unit;
   said support means being operable to be retracted or disabled when a predetermined number of blanks are present on the blank-receiving surface.

5. A device as defined in claim 4 wherein the tamper unit includes a frame member with an abutment surface for abutting the blanks.

6. A device as defined in claim 5, the support means further comprising a retractable support member, the retractable support member being mounted for movement with the frame member.

7. A device as defined in claim 6 wherein the retractable support member includes a ram movable under the drive force of a drive unit.

8. A device as defined in claim 7 wherein the drive unit includes an hydraulic cylinder, a pneumatic cylinder or a solenoid driven linear actuator.

9. A method of processing blanks, comprising the steps of:
   providing a blank-receiving surface adjacent or downstream from a discharge end of a blank processing machine;
   locating a plurality of blanks on the blank-receiving surface, wherein each of the blanks further includes at least one free edge region which extends beyond a peripheral region on the blank-receiving surface;
   aligning adjacent free edge regions of the plurality of blanks;
   providing support beneath the adjacent free edge region of the blanks;
   withdrawing the support when the accumulated plurality of blanks exceeds a predetermined number, and thereafter locating additional blanks on the predetermined number of blanks to form a stack.

10. A method as defined in claim 9, wherein the step of aligning includes abutting the adjacent free edge regions with an abutment member.

11. A method as defined in claim 10 wherein, during the step of providing support, the adjacent free edge regions are prevented from sagging below a point of contact with the abutment member.

12. A method as defined in claim 11 wherein the abutment member is aligned with the blank receiving surface and wherein, during the step of providing support, the free edge is prevented from sagging below the blank receiving surface.

13. A method as defined in claim 9 wherein the aligning step is performed at a plurality of locations, each adjacent a corresponding first free edge region.

14. A method as defined in claim 13 further comprising the step of providing an anchoring surface at a second free edge region opposite a corresponding first free edge region.

15. A method as defined in claim 9 wherein the step of providing a blank receiving surface includes providing one or more pallets, or one or more platens, platforms or frame arrangements, stationary or movable, or combination thereof, including those which are separate from or integrally formed with a mobile transfer unit.

16. A method of processing blanks, comprising the steps of:
providing a blank-receiving surface adjacent or downstream from a discharge end of a blank processing machine;
locating a plurality of blanks on the blank-receiving surface, wherein each of the blanks further includes at least one free edge region which extends beyond a peripheral region on the blank-receiving surface;
aligning adjacent free edge regions of the plurality of blanks;
the step of aligning including abutting the adjacent free edge regions with an abutment member;
providing support beneath the adjacent free edge region of the blanks, wherein the abutment member is aligned with the blank receiving surface; and
providing a retractable support member for movement with the abutment members, wherein, during the step of providing support, the free edge is prevented from sagging below the blank receiving surface.

17. A method as defined in claim 16, further comprising the step of mounting the retractable support member on the abutment member.

18. A method as defined in claim 17, further comprising the step of providing a ram to displace the retractable support member, and providing a drive force to displace the ram.

19. A method as defined in claim 18 wherein the step of providing a drive force includes attaching an hydraulic cylinder, a pneumatic cylinder or a solenoid driven linear actuator to the ram.

20. A processing line for processing blanks, comprising:
a blank processing station,
a blank receiving unit to be positioned downstream of the blank processing station, the blank receiving unit having a blank receiving surface on which blanks are to be delivered;
support means positioned adjacent the blank-receiving surface;
said support means being operable to support a free edge region of a blank resting on the blank-receiving surface and which free edge region extends beyond the blank-receiving surface;
said support means being operable to be retracted when a predetermined number of blanks are present on the blank-receiving surface, the blank receiving portion being operable after the support means has been retracted or disabled to receive additional blanks beyond the predetermined number of blanks.

21. A processing line as defined in claim 20, further comprising alignment means for aligning at least one adjacent free edge region of a plurality of blanks on the blank receiving surface.

22. A processing line as defined in claim 21 wherein the alignment means includes at least one frame member with an abutment surface for abutting the blanks and displacement means for displacing the frame member between a blank engaged position and a blank disengaged position.

23. A processing line as defined in claim 20, further comprising conveying means for conveying the blank between the blank forming station and the blank receiving surface.

24. A processing line as defined in claim 23 wherein the conveying means includes a magnetic conveyor.

25. A processing line for processing blanks, comprising:
a blank processing station, a blank receiving unit to be positioned downstream of the blank processing station, the blank receiving unit having a blank receiving surface on which blanks are to be delivered;
support means positioned adjacent the blank-receiving surface;
said support means being operable to support a free edge region of a blank resting on the blank-receiving surface and which free edge region extends beyond the blank-receiving surface;
said support means being operable to be retracted when a predetermined number of blanks are present on the blank-receiving surface, the blank receiving portion being operable after the support means has been retracted or disabled to receive additional blanks beyond the predetermined number of blanks, alignment means for aligning at least one adjacent free edge region of a plurality of blanks on the blank receiving surface, the alignment means including at least one frame member with an abutment surface for abutting the blanks and displacement means for displacing the frame member between a blank engaged position and a blank disengaged position, the support means further comprising a retractable support member, the retractable support member being mounted for movement with the frame member.

26. A processing line as defined in claim 25 wherein the retractable support member includes a ram movable under the drive force of a drive unit.

27. A processing line as defined in claim 26 wherein the drive unit includes an hydraulic cylinder, a pneumatic cylinder or a solenoid driven linear actuator.

28. A device for handling blanks, comprising:
a blank receiving portion to be positioned downstream of a blank forming machine;
the blank receiving portion defining a plane substantially parallel with a blank-receiving surface on a pallet positioned on the blank-receiving portion;
a temporary blank support assembly positioned adjacent the plane beyond at least one edge of a blank receiving surface;
said temporary blank support assembly being operable to support a free edge region of a blank resting on the blank-receiving surface and which free edge region extends beyond the blank-receiving surface;
said blank support assembly being operable to be retracted when a predetermined number of blanks are present on the blank-receiving surface, the blank receiving portion being operable after the support means has been retracted or disabled to receive additional blanks beyond the predetermined number of blanks.

29. A device as defined in claim 28, further comprising alignment means for aligning at least one adjacent free edge region of a plurality of blanks on the blank pallet.

30. A device as defined in claim 29 wherein the alignment means includes at least one frame member with an abutment surface for abutting the blanks and displacement means for displacing the frame member between a blank engaged position and a blank disengaged position.

31. A device as defined in claim 30, further comprising conveying means for conveying the blanks between the blank forming machine and the blank receiving portion.

32. A device line as defined in claim 31 wherein the conveying means includes a magnetic conveyor.

33. A device for handling blanks comprising:
   a blank receiving portion defining a plane substantially parallel with a blank-receiving surface on a pallet positioned on the blank-receiving portion;
   a temporary blank support assembly positioned adjacent the plane beyond at least one edge of the blank-receiving surface;
   said temporary blank support assembly being operable to support a free edge region of a blank resting on the blank-receiving surface and which free edge region extends beyond the blank-receiving surface;
   said blank support assembly being operable to be retracted when a predetermined number of blanks are present on the blank-receiving surface, the blank receiving portion being operable after the support means has been retracted or disabled to receive additional blanks beyond the predetermined number of blanks, alignment means for aligning at lest one adjacent free edge region of a plurality of blanks on the blank pallet, the alignment means including at least one frame member with an abutment surface for abutting the blanks and displacement means for displacing the frame member between a blank engaged position and a blank disengaged position, the support means further comprising a retractable support member, the retractable support member being mounted for movement with the frame member.

34. A device as defined in claim 33 wherein the retractable support member includes a ram movable under the drive force of a drive unit.

35. A device as defined in claim 34 wherein the drive unit includes an hydraulic cylinder, a pneumatic cylinder or a solenoid driven linear actuator.

36. A method of processing blanks, comprising:
   a step for providing a blank-receiving surface adjacent or downstream from a discharge end of a blank processing machine;
   a step for locating a plurality of blanks on the blank-receiving surface, wherein the blanks further include at least one free edge region which extends beyond a peripheral region on the blank-receiving surface;
   a step for tamping at least one free edge region of the blanks to align adjacent free edge regions thereof; and
   a step for providing temporary support beneath the free edge region of the blanks to prevent the blanks in the free edge from sagging below the plane of the blank-receiving surface; and
   a step for withdrawing the temporary support when the accumulated plurality of blanks exceeds a predetermined number, and thereafter a step for locating additional blanks on the predetermined number of blanks to form a stack.

* * * * *